(12) United States Patent
Engle

(10) Patent No.: US 7,050,228 B2
(45) Date of Patent: May 23, 2006

(54) ENVIRONMENTALLY-ADAPTIVE FRAME ASSEMBLY

(75) Inventor: Scott Engle, Tualatin, OR (US)

(73) Assignee: InFocus Corporation, Wilsonville, OR (US)

( * ) Notice: Subject to any disclaimer, the term of this patent is extended or adjusted under 35 U.S.C. 154(b) by 47 days.

(21) Appl. No.: 10/788,001

(22) Filed: Feb. 25, 2004

(65) Prior Publication Data

US 2005/0185270 A1 Aug. 25, 2005

(51) Int. Cl.
G03B 21/56 (2006.01)

(52) U.S. Cl. .................................... 359/443
(58) Field of Classification Search ............... 359/443, 359/449, 450, 457, 460; 248/693, 689, 917
See application file for complete search history.

(56) References Cited

U.S. PATENT DOCUMENTS

| 4,674,836 A | 6/1987 | Yata et al. |
| 4,729,631 A | 3/1988 | Takahashi et al. |
| 4,880,292 A | 11/1989 | Kageyama et al. |
| 4,936,657 A | 6/1990 | Tejima et al. |
| 5,100,222 A | 3/1992 | Minoura et al. |
| 5,302,983 A | 4/1994 | Sato et al. |
| 5,422,691 A | 6/1995 | Ninomiya et al. |
| 5,442,413 A | 8/1995 | Tejima et al. |
| 5,489,940 A | 2/1996 | Richardson et al. |
| 5,495,306 A | 2/1996 | Shibazaki ............ 353/99 |
| 5,699,131 A * | 12/1997 | Aoki et al. ............ 359/443 |
| 5,710,668 A | 1/1998 | Gohman et al. |
| 5,716,118 A | 2/1998 | Sato et al. |
| 5,724,195 A | 3/1998 | Enomoto et al. |
| 5,760,973 A | 6/1998 | Kawamura |
| 5,796,528 A | 8/1998 | Mihara |
| 5,805,359 A | 9/1998 | Yamanashi |
| 5,818,639 A * | 10/1998 | Furuya ............ 359/460 |
| 5,820,240 A | 10/1998 | Ohzawa ............ 353/70 |
| 5,833,339 A | 11/1998 | Sarayeddine |
| 5,870,234 A | 2/1999 | Ebbesmeier nee Schitthof |
| 5,923,479 A | 7/1999 | Nagata ............ 359/740 |
| 5,978,051 A | 11/1999 | Gohman et al. |
| 5,999,332 A | 12/1999 | Ohno |
| 6,016,229 A | 1/2000 | Suzuki |
| 6,018,425 A | 1/2000 | Nakabayashi et al. |
| 6,038,085 A | 3/2000 | Nakazawa |
| 6,046,859 A | 4/2000 | Raj |
| 6,053,615 A | 4/2000 | Peterson et al. |
| 6,081,380 A | 6/2000 | Ohshima et al. |

(Continued)

FOREIGN PATENT DOCUMENTS

JP 2989947 5/1993

OTHER PUBLICATIONS

H. Kanayama et al., "A New LC Rear-Projection Display Based on the Aspherical Mirror Projection System," IDW, 2000, pp. 1041-1044, Sanyo Electric Co., Ltd., Osaka Japan.

(Continued)

Primary Examiner—Christopher Mahoney
(74) Attorney, Agent, or Firm—Alleman Hall McCoy Russell & Tuttle LLP

(57) ABSTRACT

A frame assembly is provided. The frame assembly may include an inner frame disposed in a dimensionally stable relationship with a display screen where the relationship is substantially maintained during an environmental change which produces a variation in a size of the display screen. The frame assembly further includes an outer frame configured to capture the inner frame and accommodate size changes of the inner frame.

38 Claims, 3 Drawing Sheets

U.S. PATENT DOCUMENTS

| | | |
|---|---|---|
| 6,088,172 A | 7/2000 | Sato |
| 6,111,701 A | 8/2000 | Brown |
| 6,123,425 A | 9/2000 | Ohzawa |
| 6,137,638 A | 10/2000 | Yamagishi et al. |
| 6,147,812 A | 11/2000 | Narimatsu et al. |
| 6,201,647 B1 | 3/2001 | Ohzawa |
| 6,236,511 B1 | 5/2001 | Brown |
| 6,273,338 B1 | 8/2001 | White |
| 6,299,313 B1 | 10/2001 | Hirata et al. |
| 6,301,058 B1 | 10/2001 | Nagahara |
| 6,353,509 B1 | 3/2002 | Nakazawa |
| 6,366,400 B1 | 4/2002 | Ohzawa |
| 6,384,987 B1 | 5/2002 | Sensui |
| 6,396,641 B1 | 5/2002 | Hirata et al. |
| 6,406,150 B1 | 6/2002 | Burstyn |
| 6,407,860 B1 | 6/2002 | Funazaki et al. ........... 359/457 |
| 6,419,365 B1 | 7/2002 | Potekev et al. |
| 6,513,935 B1 | 2/2003 | Ogawa |
| 6,550,521 B1 * | 4/2003 | McNabb ..................... 359/460 |
| 6,561,649 B1 | 5/2003 | Burstyn |
| 6,614,594 B1 * | 9/2003 | Murasugi et al. ........... 359/460 |
| 6,618,196 B1 * | 9/2003 | Ikari et al. .................. 359/460 |
| 6,768,594 B1 | 7/2004 | Imafuku et al. |
| 6,804,061 B1 * | 10/2004 | Nemoto et al. ............. 359/622 |
| 6,844,967 B1 * | 1/2005 | Teramoto et al. ........... 359/443 |
| 6,848,793 B1 * | 2/2005 | Utsumi ....................... 359/443 |
| 6,962,418 B1 * | 11/2005 | Utsumi et al. .............. 359/460 |
| 2002/0008853 A1 | 1/2002 | Sunaga |
| 2002/0044263 A1 | 4/2002 | Takeuchi |
| 2003/0025885 A1 | 2/2003 | Cotton et al. |
| 2003/0197954 A1* | 10/2003 | Ikeda et al. ................. 359/460 |
| 2003/0231261 A1 | 12/2003 | Bassi et al. |
| 2004/0001254 A1 | 1/2004 | Shimizu |

OTHER PUBLICATIONS

J. Ouellette, "Digital Displays with Micromirror Devices," American Institute of Physics, Jun. 1997, pp. 9-11.

J. Shinozaki, et al. "15.3: A 50-in. Ultra-Slim Liquid-Crystal Rear Projector," SID 92 Digest, 1992, pp. 273-276, Seiko Epson Corp., Tokyo, Japan.

* cited by examiner

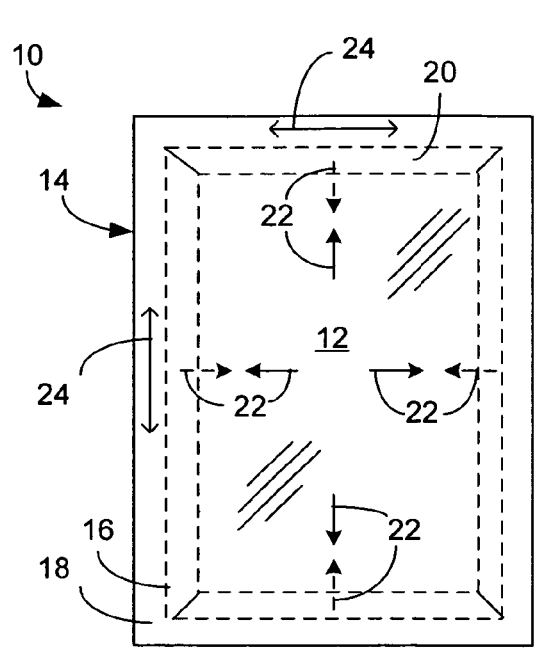
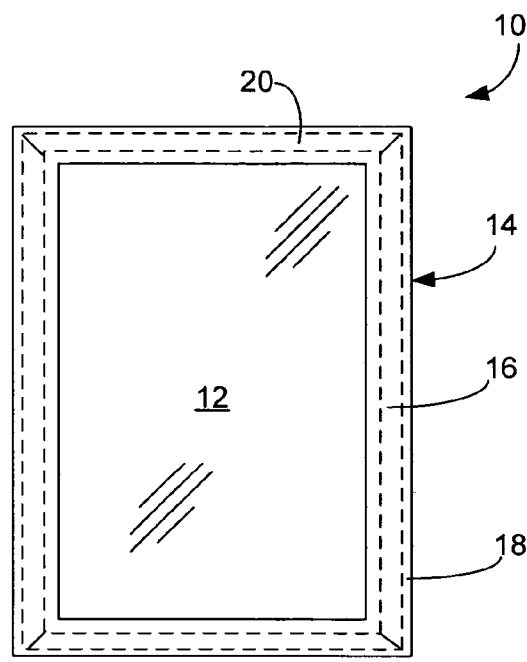
FIG. 1  FIG. 2
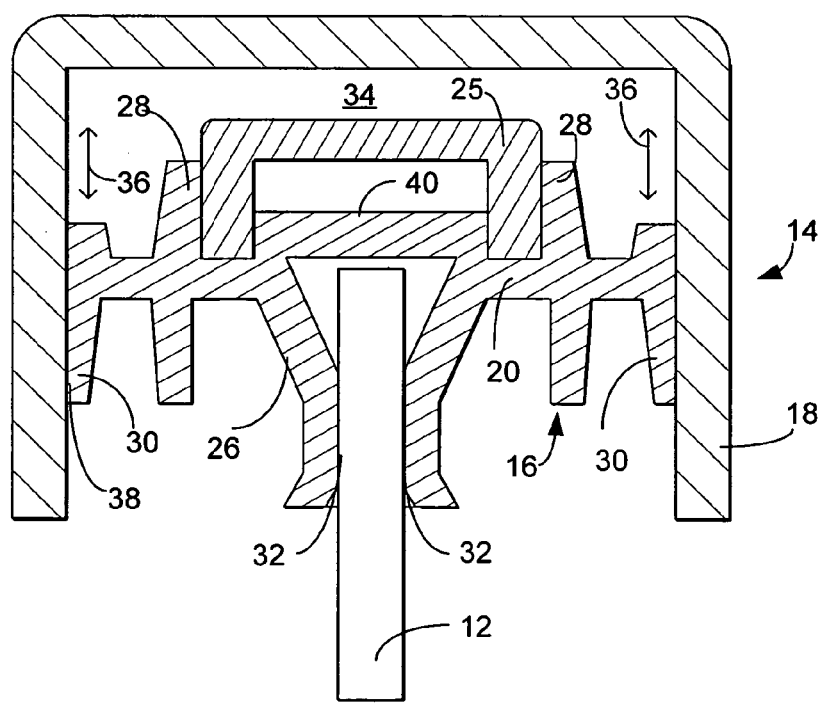
FIG. 3

ENVIRONMENTALLY-ADAPTIVE FRAME ASSEMBLY

FIELD OF INVENTION

The embodiments of the present invention relates generally to image display devices, and more particularly to a frame assembly for display of an image.

BRIEF DESCRIPTION OF THE DRAWINGS

The invention is illustrated by way of example and not by way of limitation in the figures of the accompanying drawings, in which the like references indicate similar elements and in which:

FIG. 1 is a schematic diagram of an embodiment of a screen assembly showing the balance of forces between a screen and an inner frame and movement of the inner frame relative to an outer frame;

FIG. 2 is a plan view of an embodiment of a screen assembly including a screen and a frame assembly with an inner frame shown in dashed lines;

FIG. 3 is a partially-sectioned view of the screen assembly of the embodiment of FIG. 2;

DETAILED DESCRIPTION

Figure 4:
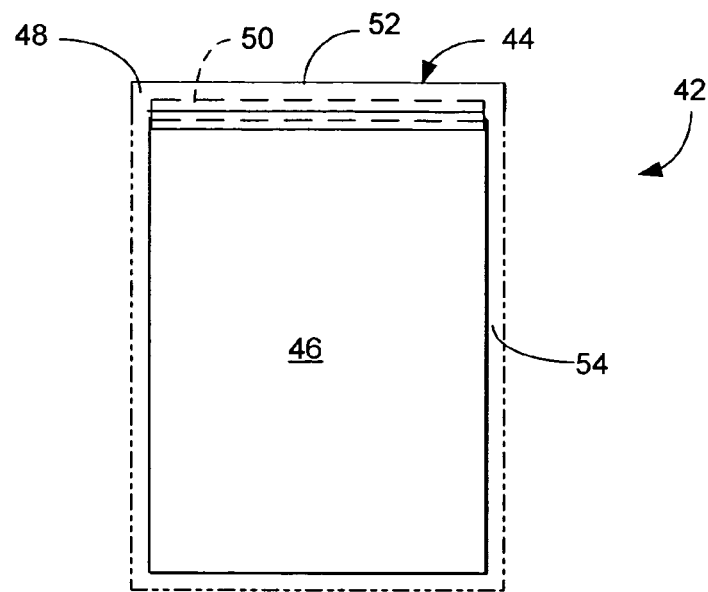
FIG. 4 is another schematic plan view of an embodiment of a screen assembly including a screen and a frame assembly.

FIG. 1 illustrates a screen assembly 10 configured to substantially reduce the effects of environmental changes, such as temperature and/or humidity fluctuations on image quality. Screen assembly 10 includes a screen 12 and a frame assembly 14. Screen 12 may be any type of screen, such as, but not limited to, a Fresnel lens type screen. Moreover, screen 12 may be any other suitable screen and may include one or more components. For example, screen 12 may include a Fresnel lens type screen and a diffusion screen or touch screen.

Frame assembly 14 provides a frame to support screen 12. Screen 12 may be composed of a thin, pliable material such that the screen readily flexes. As will be described in further detail, mounting the screen in frame assembly 14 may facilitate to reduce screen flex and potential image distortion. Moreover, frame assembly 14 may be configured to retain screen 12 in a substantially flat orientation regardless of changes in temperature and/or humidity.

In one embodiment, frame assembly 14 includes an inner frame 16 and an outer frame or casing 18. Outer frame 18 may support and retain inner frame 16 and, in some embodiments, may be configured to be incorporated within a variety of enclosure-type structures such as, but not limited to, a cabinet type enclosure. Alternatively, the outer frame 18 may be configured to be mounted on a variety of structures and/or surfaces such as, but not limited to, other mounts, walls, etc. A variety of fastening mechanisms (not shown) may be used to facilitate incorporation and/or mounting.

Inner frame 16 may be composed of screen retainment sections 20. Screen retainment sections 20 may be configured to engage screen 12. In some embodiments, inner frame 16 may include a plurality of screen retainment sections 20 which extend around at least a portion of the perimeter of screen 12. In some embodiments, screen retainment sections 20 may be configured to join at the corners of screen 12. In other embodiments, a single screen retainment section may be a unitary piece that may extend substantially around the entire perimeter of the screen. In other embodiments, the screen retainment sections 20 may extend along only a portion of the perimeter of the screen, such as for example the top edge of the screen.

Inner frame 16 may provide tension to screen 12. The tension may be provided such that screen 12 remains in a substantially flat state. Arrows 22 indicate the balance of forces between screen 12 and inner frame 16. As illustrated, the screen 12 may be in tension while the inner frame may be in compression. The tension/compression of the screen 12 and inner frame 16 may be maintained through environmental changes as the screen 12 and inner frame 16 may be configured to have substantially the same response to the environmental changes. Thus, the screen and inner frame may be configured to expand and contract together in response to environmental changes such as, but not limited to, temperature fluctuations, humidity fluctuations, etc. As such, the screen and inner frame may be considered to be in a dimensionally stable relationship. Outer frame 18 may respond differently to environmental changes, but may accommodate such differential expansion and contraction by enabling the screen 12 and inner frame 16 (may be considered together as an internal unit) to move such as, but not limited to, a sliding motion within the outer frame 18. Arrows 24 may indicate the motion of the screen 12 and inner frame 16 within the outer frame 18.

In some embodiments, inner frame 16 and screen 12 may be assembled in a state of substantially minimum or neutral tension. The substantially minimum or neutral tension of the screen 12 and inner frame 16 may be maintained through environmental changes as the screen 12 and inner frame 16 may be configured to have substantially the same response to the environmental changes. Thus, the screen 12 and inner frame 16 may be configured to expand and contract together in response to temperature fluctuations. As such, the screen 12 and inner frame 16 may be considered to be in a dimensionally stable relationship. Outer frame 18 may respond differently to environmental changes, but may accommodate such differential expansion and contraction by enabling the screen 12 and inner frame 16 (may be considered together as an internal unit) to slide within the outer frame 18. As described above, arrows 24 may indicate the motion of the screen 12 and inner frame 16 within the outer frame 18.

FIG. 2 is a plan view of an embodiment of a screen assembly (indicated generally at 10) including a screen 12 and a frame assembly 14 with an inner frame 16 shown in dashed lines. Inner frame 16 may be suspended within outer frame 18. As described above, inner frame 16 may slidably move within outer frame 18. As described in more detail below, inner frame 16 may have similar thermal properties as screen 12 such that inner frame 16 and screen 12 move together in response to thermal changes within outer frame 18. Such a configuration may make the entire assembly thermally and environmentally tolerant.

As described above, screen 12 may be affected by environmental changes, such as, but not limited to temperature and/or humidity. The changes in temperature and/or humidity may result in contraction and/or expansion of the screen 12. To accommodate such changes, screen retainment sections 20 of inner frame 16 may be at least partially composed of a material that has the same or substantially similar coefficient of thermal expansion as that of screen 12. Thus, when screen 12 contracts or expands due to environmental changes, screen retainment sections 20 may similarly contract or expand. By having both the screen retainment sections 20 and the screen 12 expand and contract as a unit, the stresses and strains resulting in screen flex and distortion may be reduced or substantially eliminated. Thus, the inner frame 16 and the outer frame 18 may be considered to be environmentally or thermally tolerant as the inner frame 16 and outer frame 18 cooperate to maintain the screen 12 in a desired flat orientation regardless of environmental changes.

For example, in a rear projection system, a wide-angle lens may project an image to a screen, such as, but not limited to, a Fresnel lens type screen (hereon out, a Fresnel screen). In the example of the Fresnel screen, groove angles of the Fresnel screen may affect the image quality to a viewer. Flex or bend in the Fresnel screen may result in a change in the way the image is produced on the Fresnel screen. Flex of the Fresnel screen may occur due to environmental changes such as those previously described, e.g., temperature and/or humidity fluctuations, as the material of the Fresnel screen may be prone to expansion and contraction. By maintaining the Fresnel screen in a substantially flat orientation using the environmentally-adaptive frame assembly described herein, the effect of environmental changes on the Fresnel screen may be substantially reduced.

Continuing with the above example, the Fresnel screen may be made of any suitable material, including, but not limited to, polycarbonate, styrene, acrylic or combinations thereof. Screen retainment sections 20 may also be composed of the substantially similar material as the Fresnel screen, such that both the Fresnel screen and the screen retainment sections have substantially similar responses to environmental changes such as, but not limited to, changes in humidity and temperature.

In other embodiments, screen retainment sections 20 may be composed of a different material than the screen 12. However, the different material may be selected such that it has similar physical properties as the screen material. For example, the screen retainment sections 20 may be of a material selected such that it has a similar coefficient of thermal expansion as the material of the screen 12. Moreover, the screen retainment sections 20 material may be selected such that it has similar hygroscopic properties (i.e., affected by moisture) as the material of the screen 12. Suitable material for screen retainment sections 20 include, but are not limited to, various polymers, such as polystyrene, nylons, acrylics, etc.

It should be appreciated that materials for the screen retainment sections 20 may be based on other properties of the material. For example, the material may be selected due to its frictional properties which may enhance the ability of the material to grip or retain the screen. Moreover, the chemical and/or structural stability of the material over time may make some materials more desirable than other materials.

FIG. 3 illustrates a partially sectioned view of a frame assembly which may be used to support a screen as shown in FIG. 2. Specifically, FIG. 3 illustrates a screen 12 supported within a frame assembly 14. Frame assembly 14 includes an inner frame 16 and an outer frame 18. As shown, inner frame 16 may include screen retainment sections 20 and, optionally, a stiffener 25. Screen retainment sections 20 may abut screen 12 to retain screen 12 at a predesired tension within the frame assembly 14.

Inner frame 16 (or more specifically screen retainment sections 20) may include one or more ribs or extensions. For example, inner frame 16 may include screen retainer ribs 26, one or more support ribs 28 and outer frame contact ribs 30. Briefly, screen retainer ribs 26 may be configured to contact and retain screen 12. Screen retainer ribs 26 may be of any suitable configuration to support screen 12 within frame assembly 14. In some embodiments, screen retainer ribs 26 may pinch or otherwise grip screen 12. For example, in the illustrated embodiment, screen retainer ribs 26 form a channel or opening into which screen 12 may be disposed. The screen retainer ribs 26 may have an extended contact portion 32 to provide a larger area of contact with screen 12 and which may prevent the screen 12 from disengaging from the screen retainer ribs 26.

As described above, inner frame 16 may include additional structures. Support ribs 28 of inner frame 16 may provide structural support to the screen retainment sections 20 such that the screen retainment sections 20 do not bend or collapse on itself. Moreover, support ribs 28 may support a stiffener 25, described in more detail below. Likewise, outer frame contact ribs 30 of inner frame 16 may be configured to engage the internal walls of the outer frame 18 such that inner frame 16 floats within outer frame 18. Floating, as used herein, includes a state where the inner frame 16 is suspended within the outer frame 18. A space 34 may be provided such that the inner frame 16 may hover or float within the outer frame 18. Inner frame 16 may slide or move (as indicated by arrows 36) within space 34 defined by outer frame 18. However, due to the configuration of the frame assembly 14, inner frame 16 may remain substantially captured within outer frame 18.

Inner frame 16 may be at least partially composed of a material having a substantially similar or identical thermal coefficient of thermal expansion as screen 12. Thus, the screen 12 and the inner frame 16 may similarly react to temperature changes, thereby maintaining a substantially constant relationship between the screen 12 and the screen retainment sections 20. For example, when the temperature rises, the screen 12 and screen retainment sections 20 may expand together, and thus may prevent distortion due to compression and/or expansion of the screen 12 relative the frame assembly 14, which may be caused by dissimilar expansion rates.

In FIG. 3, outer frame 18 may extend around the entire perimeter of screen 12. Accordingly, inner frame 16 may be trapped within outer frame 18 maintaining screen 12 in a substantially flat plane. Although described as extending around the entire perimeter of the screen 12, it should be noted that in some embodiments, the frame assembly 14 may extend only partially around the perimeter of the screen 12. Moreover, although illustrated as a contiguous assembly, the frame assembly 14 may be composed of multiple spaced-apart structures.

The outer frame 18 may be composed of any suitable material. Suitable materials include, but are not limited to substantially rigid and stiff materials. As a non-limiting example, outer frame 18 may be aluminum, metal, reinforced plastics, glass-filled polymers, etc. The outer frame 18, in combination with the inner frame 16, may operate to retain the screen 12 such that it remains substantially flat. The outer frame 18 may be mounted and secured to a variety of additional structures, such as a cabinet or other mount, of a projection assembly.

Inner frame 16 may be configured to be retained or captured within outer frame 18. Inner frame 16 may "float" within outer frame or bezel 18 (as shown in FIG. 2). Inner frame 16 may be substantially supported within outer frame 18 such that outer frame 18 can accommodate the expansion and contraction of inner frame 16. For example, in the illustrated embodiment, outer frame contact ribs 30 may engage interior plate or side 38 of outer frame 18. Outer frame contact ribs 30 may be configured to slide (as the screen and screen retainment sections contract and expand) along interior plate or side 38 of outer frame 18 (indicated schematically by arrows 36). In some embodiments, a lubricant, or other friction reducer, may be applied or used to further enable inner frame 16 to slide within outer frame 18. It should be appreciated that in some embodiments, the inner frame 16 may be composed of different types of materials. For example, the outer frame contact ribs 30 may be a low friction material while the screen retainer ribs 26 may be a high friction material.

The frame assembly 14 may be constructed in any suitable manner. For example, the frame assembly 14 may be molded or extruded. The molding and/or extruding process may be used to ensure that the overall frame assembly is straight and rigid.

In some embodiments, inner frame 16 may further include a stiffener 25. Stiffener 25 may be configured to reinforce inner frame 16 and screen retainment sections 20. Stiffener 25 may slide axially along screen retainment sections 20 between one or more support ribs 28 or other structure, such as bridge 40. In some embodiments, stiffener 25 may be composed of a substantially rigid material, preventing the collapse of screen retainment sections 20. In some embodiments, stiffener 25 may be composed of the same material as outer frame 18. For example, stiffener 25 may be metal, reinforced plastic, glass-filled polymers, ceramics, etc. In the illustrated embodiment, stiffener 25 may be a continuous piece that extends along the channel formed by support ribs 28 and bridge 40. In other embodiments, stiffener 25 may be individual segments, which may be linked via a spine or other suitable structure. In other embodiments, outer frame 18 may function as a stiffener.

FIG. 4 illustrates a plan view of another embodiment of a screen assembly indicated generally at 42. Screen assembly 42 includes a frame assembly 44 and a screen 46. Frame assembly 44 may extend along only a portion of the perimeter of screen 46. In the depicted embodiment, frame assembly 44 extends along the top edge 48 of screen 46, but may extend along any other edge or portion of an edge. Frame assembly 44, includes an inner frame 50 (indicated by dashed lines in FIG. 4) and an outer frame 52. Additional structure may extend around the perimeter of the screen 46 as indicated at 54. The additional structure 54 may retain the screen 46 in a substantially stationary position or provide additional tension to screen 46. It should further be noted that additional structure 54 may extend across other regions of the screen (not shown).

Figure 5:
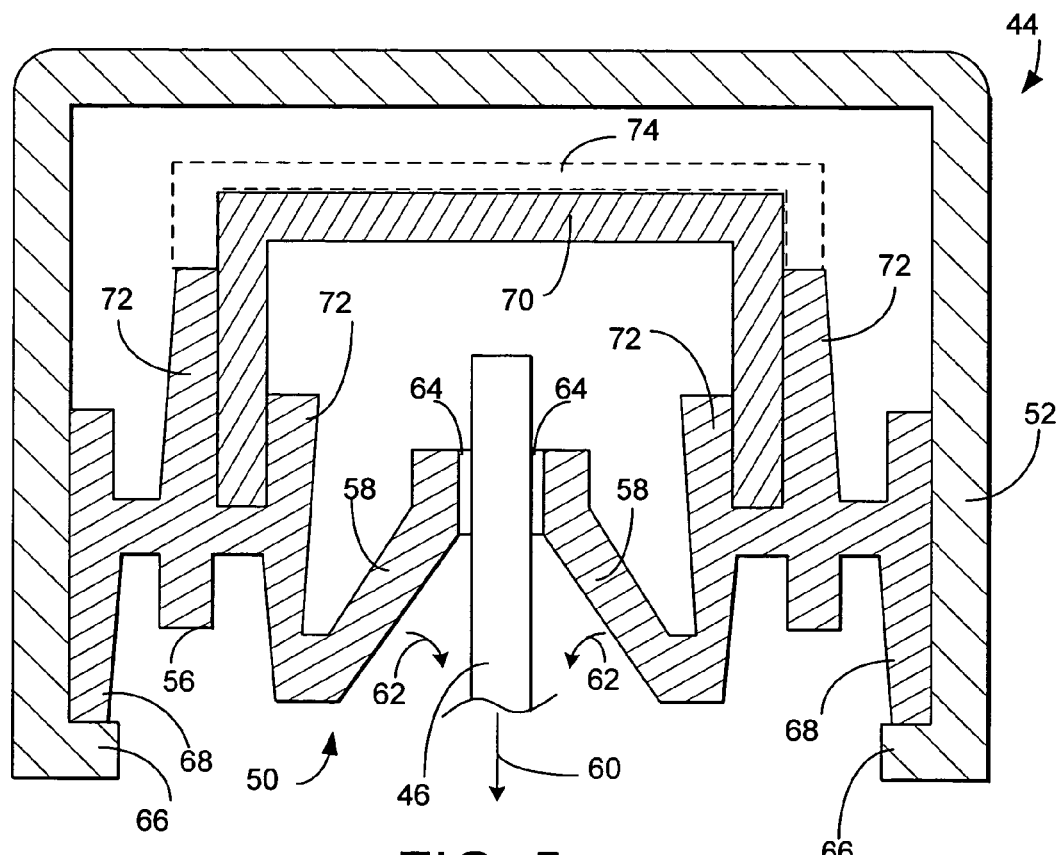
FIG. 5 is a partially-sectioned view of the screen assembly of the embodiment of FIG. 4.

FIG. 5 illustrates a partially sectioned view of screen assembly 42 shown in FIG. 4. As described above in regards to the disclosed frame assemblies, frame assembly 44 includes an inner frame 50 and an outer frame 52. Inner frame 50 includes screen retainment sections 56 adapted to retain screen 46. As discussed above in regards to FIG. 3, inner frame 50 may include screen retainment sections 56 which may be composed of a material with a same or substantially similar coefficient of thermal expansion as screen 46. The material may further have similar properties in regards to expansion due to changes in humidity. By selecting a material for screen retainment sections 56 which functions in approximately the same manner as the screen 46 in response to temperature and humidity fluctuations, the frame assembly 44 may be able to adapt to environmental changes without causing increased screen distortion. As described above, the screen retainment sections 46 of the inner frame 50 floats within the outer frame 52 such that the inner frame 50 and outer frame 52 cooperate to prevent flexing and rotation of the screen 46 with environmental changes.

Screen retainment sections 56 include screen retainer ribs 58 configured to hold screen 46 in a desired position. In some embodiments, screen retainer ribs 58 may be configured to be biased toward each other such that screen 46 is pinched and firmly secured within the screen retainer ribs 58. For example, in the illustrated embodiment, screen retainer ribs 58 may be angled such that the angled retainer ribs tend to rotate and pinch the screen. The screen retainer ribs 58 may be self-locking ribs. In such a configuration, the screen retainer ribs 58 may be considered to be spring-biased to prevent the screen 46 from releasing from the retainer ribs when pulled in the direction indicated by arrow 60 (such as by gravity). Arrows 62 indicate the rotation of retainer ribs 58 against screen 46 locking screen 46 in position between the retainer ribs 58. Other suitable spring-biased mechanisms or locking mechanisms may be used to engage and retain the screen 46. For example, torsion springs, cams, pawl and ratchet mechanisms, etc. may be integrated within the inner frame 50 to retain the screen 46 in position.

In some embodiments, screen retainer ribs 58 may include friction pads 64 or other suitable gripping devices to increase the friction between the contact region of the screen retainer ribs 58 and the screen 46. Such friction pads may prevent the screen from slipping from the screen retainer ribs 58. The screen retainer ribs 58 may further include mechanical features, such as teeth, serrations, etc. which further prevent the release of screen 46 from retainer ribs 58.

In some embodiments, screen retainment sections 56 may extend along the upper portion or top edge of a screen such that the screen hangs downward (as illustrated in FIG. 4). Thus, the screen may be "hung." The outer frame may be mounted within a cabinet or other suitable structure. The screen may be held flat due to the tension in the hanging screen as a result of the pull of gravity. Other methods may be used to hold or retain the bottom and opposing sides of the screen.

Outer frame 52 also may include inner frame assembly retainment structures. For example, outer frame 52 may include inner frame section support or lip 66. Inner frame section support 66 may be an inwardly extending structure extending from outer frame 52 configured to prevent inner frame 50 and screen retainment sections 56 from slipping relative to outer frame 52. Inner frame section support 66 may be sufficiently sized such that contraction of screen retainment sections 56 does not effect the positioning of screen retainment sections 56 within outer frame 52. Specifically, outer frame contact ribs 68 may be configured to slidably engage the interior side of outer frame 52. Outer frame contact ribs 68 may further be configured to rest on inner frame section support 66. Inner frame section support 66 may provide a shelf for outer frame contact ribs 68 preventing outer frame contact ribs 68 from slipping relative to the outer frame 52. The inner frame section support 66 may further substantially extend toward screen retainer ribs providing additional support to the screen retainment sections 56. It should be appreciated that in some embodiments, other structures may be used to prevent the inner frame from falling away from the outer frame.

The embodiment in FIG. 4 further illustrates another stiffener 70. As described above, the stiffener 70 may be optional and may be composed of a substantially rigid material to provide support for inner frame 50. Stiffener 70 may be disposed within the channel formed by support ribs 72. In some embodiments, stiffener 70 may bridge screen retainment sections 56. The stiffener may be formed integral to the screen retainment sections 56. In some embodiments, the screen retainment sections 56 may include a bridge (indicated by dashed lines 74), which may form a channel into which stiffener 70 may be inserted.

Figure 6:
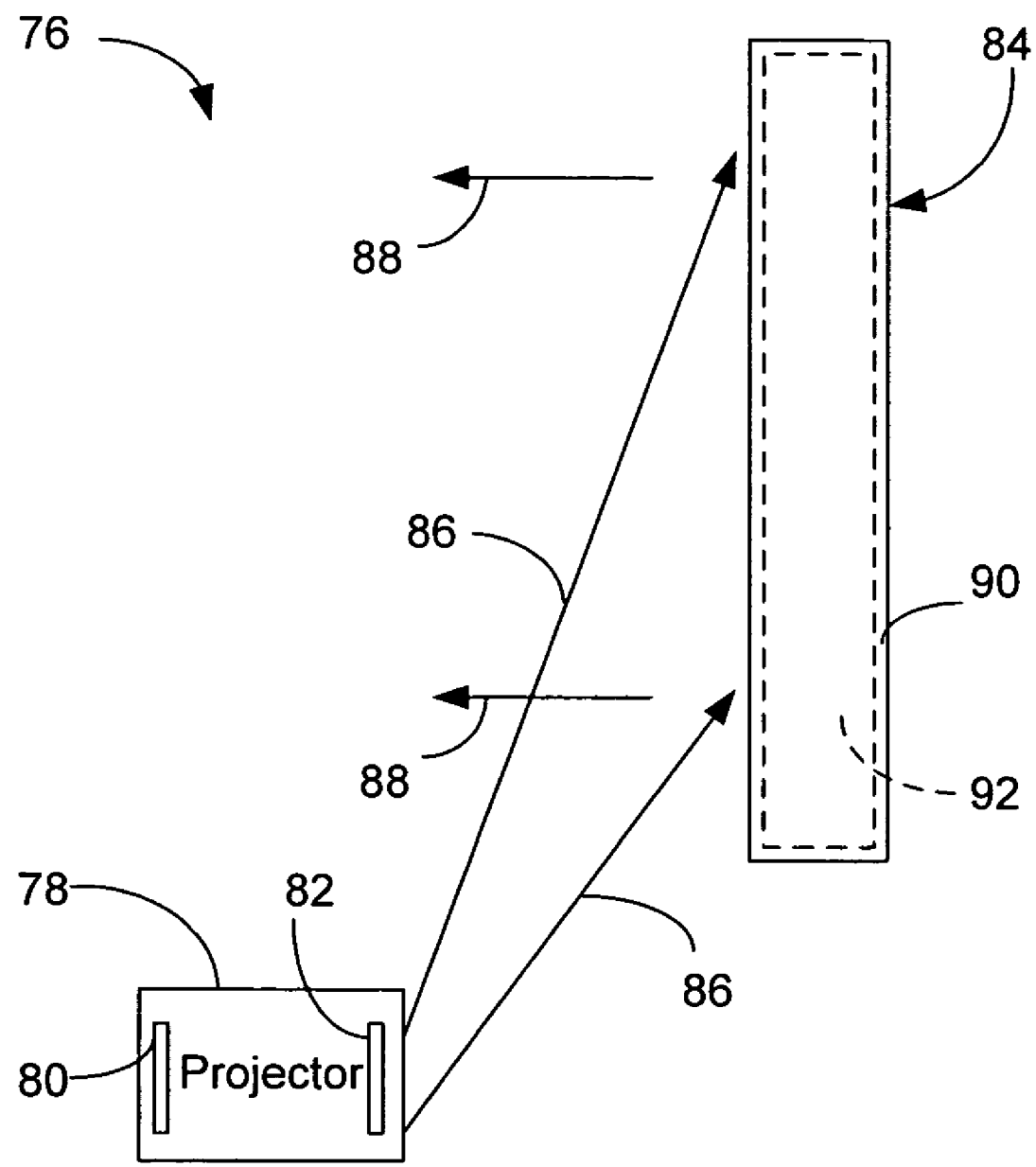
FIG. 6 is a schematic diagram of an image display device according to an embodiment of the present disclosure.

FIG. 6 illustrates an image display device generally at 76 according to an embodiment of the present disclosure. As illustrated, image display device 76 may be a projection display device including an imaging device, such as a projector 78, including a light source and/or image source 80. The image source may include image-generation devices, including, but not limited to, digital micromirror devices (DMD), microelectromechanical systems (MEMS), grating light valve devices (GLV), liquid crystal display devices (LCD), liquid crystal on silicon devices (LCOS), etc.

The image display device 76 may further include a lens system 82 which may be integrated within projector 78 or otherwise coupled to projector 78 such that an image generated by light source or image source 80 is projected to a screen assembly 84 as indicated by arrows 86. The image may be displayed to a viewer as indicated by arrows 88. In some embodiments, the image may be displayed to a viewer disposed on the same side as the projector, such as in a front projection system. In other embodiments, the image may be displayed to a viewer on the opposing side of the screen assembly from the projector, such as a rear projection system. Thus, it should be appreciated that the above screen and frame assembly may be implemented in a variety of systems, such as a front projection display device, a rear projection display device, etc. without departing from the scope of the disclosure.

Lens system 82 may be any suitable lens system. In some embodiments, lens system 82 may be a wide-angle lens system. Description of an exemplary wide-angle lens system and an exemplary image display device is described in U.S. patent application Ser. No. 10/222,050, entitled "Wide Angle Lens System Having Distorted Intermediate Image," filed on Aug. 16, 2002, and U.S. patent application Ser. No. 10/222,083 entitled "Rear Projection Display Device Having Multiple Mirrors That Are Substantially Parallel To A Screen" also filed on Aug. 16, 2002, both applications of which are hereby incorporated by reference for all purposes. It should be appreciated that other lens systems and display devices may use the frame assembly described herein without departing from the scope of the disclosure.

Image display device 76 further may include a screen assembly 84 including an environmentally-adaptive frame assembly 90 and a screen 92. As described above, environmentally-adaptive frame assembly 90 may be configured to maintain the screen 92 in a flat orientation through environmental changes, e.g. thermal changes, or humidity changes. It should be appreciated that in some embodiments the screen 92 may be a Fresnel lens type screen, however other suitable screens may be used.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A frame assembly comprising:
an inner frame disposed in a dimensionally stable relationship with a display screen where the relationship is substantially maintained during an environmental change which produces a variation in a size of the display screen; and
an outer frame configured to hold the inner frame and accommodate size changes of the inner frame by enabling the display screen and the inner frame to move as an internal unit relative the outer frame.

2. The frame assembly of claim 1, wherein the environmental change is a change in temperature.

3. The frame assembly of claim 1, wherein the environmental change is a change in humidity.

4. The frame assembly of claim 1, wherein a size of the inner frame has a similar variation as the variation of a size of the display screen.

5. The frame assembly of claim 1, wherein the inner frame and the display screen expand during the environmental change.

6. The frame assembly of claim 1, wherein the inner frame and the display screen contract during the environmental change.

7. The frame assembly of claim 1, wherein the display screen has a coefficient of thermal expansion and the inner frame has a substantially similar coefficient of thermal expansion.

8. The frame assembly of claim 1, wherein the display screen and the inner frame are at least partially of the same material.

9. The frame assembly of claim 1, further comprising a stiffener configured to support the inner frame.

10. The frame assembly of claim 9, wherein the stiffener is made at least partially of a substantially rigid material.

11. The frame assembly of claim 9, wherein the stiffener is braced between a pair of support ribs extending from the inner frame.

12. The frame assembly of claim 1, wherein the inner frame is configured to slide within the outer frame.

13. The frame assembly of claim 1, wherein the inner frame includes screen retainer ribs configured to engage the display screen.

14. The frame assembly of claim 13, wherein the retainer ribs are configured to substantially lock the screen within the inner frame.

15. The frame assembly of claim 14, wherein the retainer ribs are spring biased.

16. The frame assembly of claim 1, wherein the outer frame includes an inner frame section support to support the inner frame within the outer frame.

17. The frame assembly of claim 16, wherein the inner frame section supports include inwardly extending members to prevent the inner frame from sliding out of the outer frame.

18. A frame assembly to support a display screen, the frame assembly comprising:
  an inner frame including a screen retainment section configured to retain a display screen of a first material, where the screen retainment section is composed of a second material having a substantially similar coefficient of thermal expansion as the first material; and
  an outer frame substantially enclosing the inner frame such that the inner frame floats within the outer frame.

19. The frame assembly of claim 18, wherein the first material is identical to the second material.

20. The frame assembly of claim 18, wherein the outer frame is a third substantially rigid material.

21. The frame assembly of claim 18, wherein the first material and second material are flexible materials.

22. A frame assembly to support a display screen, the frame assembly comprising:
  an inner frame including a screen retainment section configured to retain a display screen of a first material, where the screen retainment section is composed of a second material having a substantially similar coefficient of thermal expansion as the first material;
  a stiffener adaptively coupled to the screen retainment section; and
  an outer frame substantially enclosing the inner frame such that the inner frame floats within the outer frame.

23. The frame assembly of claim 22, wherein the screen retainment section includes screen retainer ribs configured to grip the display screen.

24. A screen assembly comprising
  a screen configured to have a predetermined response to an environmental change; and
  a frame assembly including an inner frame and an outer frame, wherein the inner frame tensions the screen and is configured to have a substantially identical response to the environmental change as the screen, and further wherein the outer frame has no contact with the screen.

25. The screen assembly of claim 24, wherein the environmental change is a change in temperature.

26. The screen assembly of claim 24, wherein the environmental change is a change in humidity.

27. The screen assembly of claim 24, wherein the screen comprises a Fresnel lens type screen.

28. The screen assembly of claim 24, wherein the inner frame of the frame assembly is composed of a material having a substantially identical coefficient of thermal expansion as the screen.

29. The screen assembly of claim 24, wherein the inner frame includes spring-biased retainer ribs to secure the screen in a preselected position.

30. The screen assembly of claim 24, wherein the inner frame extends along an upper edge of the screen.

31. The screen assembly of claim 24, wherein the inner frame is configured to float within the outer frame.

32. The screen assembly of claim 24, wherein the inner and outer frame extend at least partially around a perimeter of the screen.

33. The frame assembly of claim 22, wherein the first material is identical to the second material.

34. The frame assembly of claim 22, wherein the outer frame is a third substantially rigid material.

35. The frame assembly of claim 22, wherein the first material and the second material are flexible materials.

36. The frame assembly of claim 22, wherein the display screen is at least partially formed from at least a second of a Fresnel lens type screen.

37. The frame assembly of claim 22, wherein the inner frame is in a dimensionally stable relationship with the display screen where the relationship is substantially maintained during an environmental change which produces a variation in the size of the display screen.

38. The frame assembly of claim 37, wherein the environmental change is one of a change in temperature and humidity.

* * * * *